United States Patent [19]

Scott

[11] 4,046,134

[45] Sept. 6, 1977

[54] SOLAR HEATER WITH AUTOMATIC VENTING

[75] Inventor: Paul B. Scott, Topanga, Calif.

[73] Assignee: Xonics, Inc., Van Nuys, Calif.

[21] Appl. No.: 717,607

[22] Filed: Aug. 26, 1976

[51] Int. Cl.² .............................................. F24J 3/02
[52] U.S. Cl. ........................................ 126/270; 52/1;
 165/81; 126/271; 236/49
[58] Field of Search ............... 126/270, 271; 237/1 A;
 52/1, 72; 165/81, 82, 157, 175; 236/49; 165/48,
 171, 172

[56] References Cited

U.S. PATENT DOCUMENTS

| 3,270,739 | 9/1966 | Thomason | 126/271 |
| 3,453,777 | 7/1969 | Reilly | 52/1 |
| 3,557,497 | 1/1971 | Schafer et al. | 52/1 |
| 3,949,732 | 4/1976 | Reines | 126/270 |
| 3,994,276 | 11/1976 | Pulver | 126/270 |
| 4,005,547 | 2/1977 | Caldwell | 236/49 |

*Primary Examiner*—Kenneth W. Sprague
*Assistant Examiner*—James O. Yeung

[57] ABSTRACT

An apparatus for collecting solar energy wherein a heat exchange array of plastic or the like is protected against damage by excessive heat buildup. The array is housed in a normally closed chamber having a portion transparent to solar rays and the chamber is periodically vented by means responsive to heat expansion of the enclosed array. The invention permits substantial cost reductions in solar heat exchanges; particularly of the type adapted to heat buildings, swimming pools and domestic water systems.

8 Claims, 4 Drawing Figures

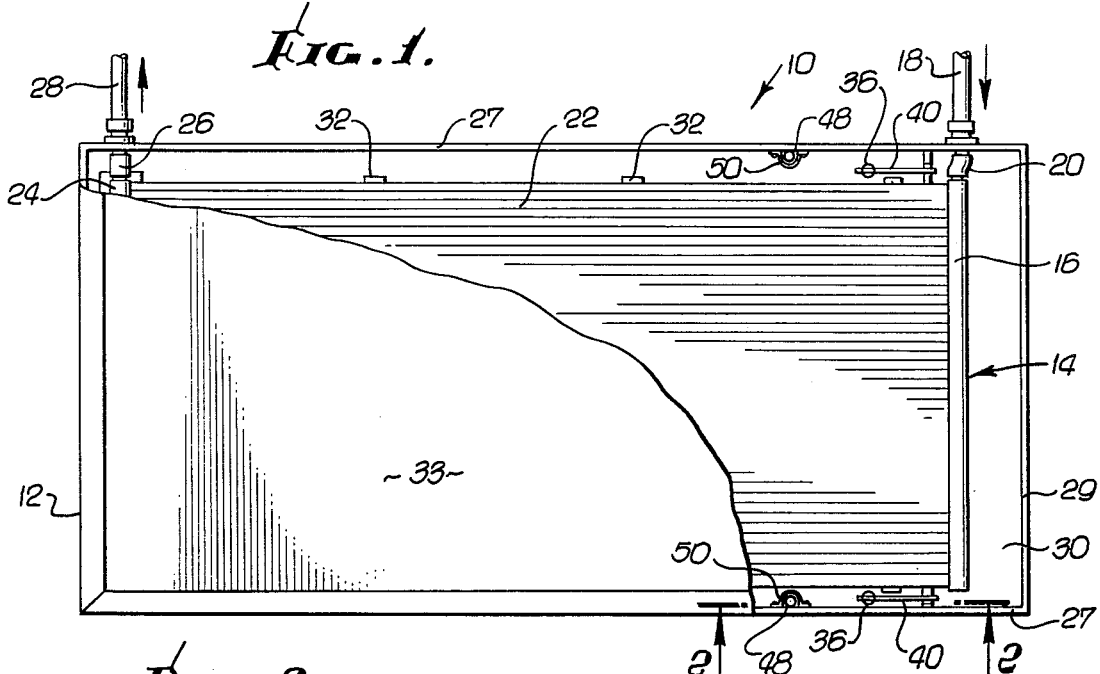
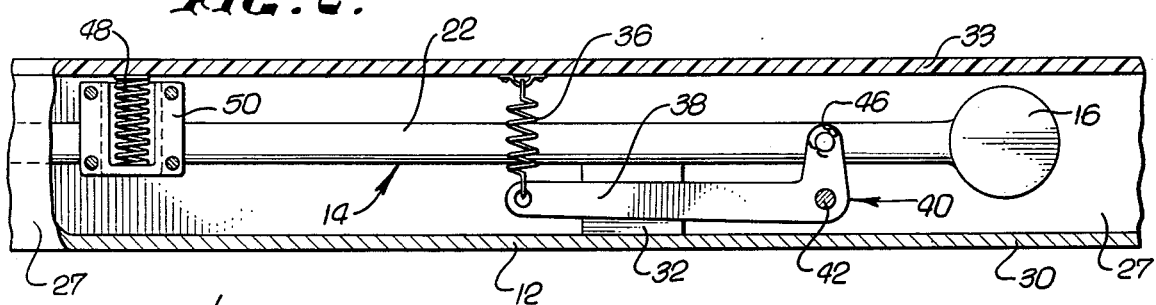
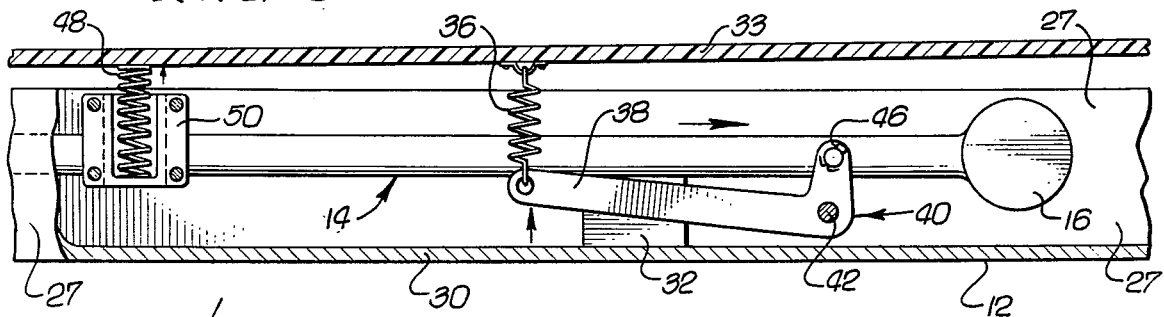
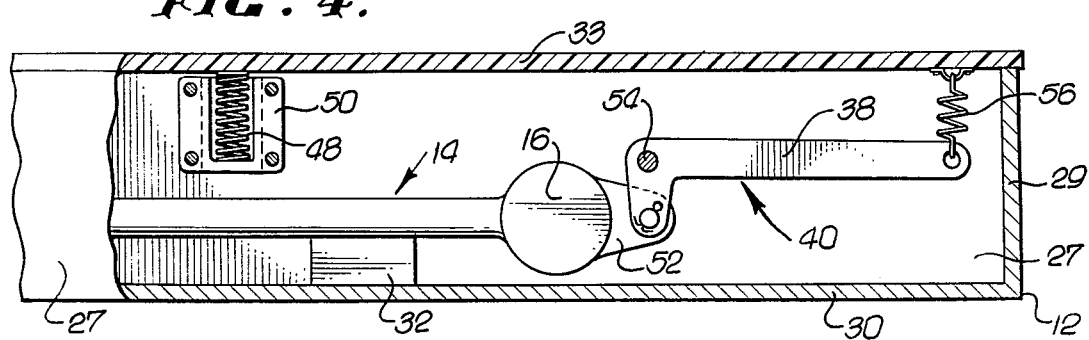

SOLAR HEATER WITH AUTOMATIC VENTING

SUMMARY OF THE INVENTION

The invention is directed to an improved heat collector for solar systems. Specifically, it solves a problem associated with the so-called "greenhouse" type of collector wherein a solar absorber-heat exchanger is enclosed in a housing having a glazed surface for exposure of the absorber to solar rays. The invention permits the safe substitution of plastic absorber-exchangers for ones of copper or other metals currently costing many times that of the plastics employed herein. Use of plastic in greenhouse collectors has heretofore involved the danger of severe damage to the plastic by heat buildup within the closed structure housing the absorber-exchanger unless some means of removing excess heat resulting from a failure of the fluid circulation system is provided. The invention utilizes thermal expansion of the plastic absorber-exchanger to vent the collector interior to ambient air if a preselected temperature is exceeded, thus permitting the safe use of plastic arrays.

BRIEF DESCRIPTION OF THE DRAWINGS

FIG. 1 is a plan view of a greenhouse type collector incorporating the invention;

FIG. 2 is a partial vertical section taken along line 2—2 of FIG. 1;

FIG. 3 is a view of that portion of the device shown in FIG. 2 with the uppermost glazed cover element raised by expansion of a housed array by the suns rays; and FIG. 4 shows an alternate embodiment of the device shown in FIGS. 1, 2 and 3.

DESCRIPTION OF THE PREFERRED EMBODIMENT

FIG. 1 shows a greenhouse type solar heat collector generically designated by reference numeral 10 and incorporating the invention. A housing 12, which may be of a suitable metal or plastic encloses an elongate solar abosorber-heat exchanger generically designated 14 and including a manifold 16 for fluid inlet from conduit 18 through flexible connector 20 to a plurality of tubular elements 22 connected in fluid flow relation thereto. A second manifold 24 is fixed to the opposite ends of elements 22, also in fluid flow relation thereto and leads through a rigid connector 26 to an outlet conduit 28. The opposite end of manifold 24, not shown, is suitably fixed to housing 12 to prevent movement of that end of the exchanger in respect to housing 12 in response to expansion or contraction of the entire assembly as the internal temperature of the collector varies as described below.

As shown in FIGS. 1 and 2, housing 12 may be of the configuration of a generally rectangular pan-line container with side walls 27, end walls 29 and bottom wall 30 as best shown in FIGS. 2 through 4. Housing 12 may be a stamping if of metal or molded or extruded if of a plastic of a type later described. The open face of housing 12 is positioned in use toward the sun and is normally closed by a planiform light transparent element or cover 33, glazed either with a suitable transparent plastic film or with glass. Exchanger 14 is supported within housing 12 on a plurality of bar-like elements 32 disposed in parallel spaced relation longitudinally of the exchanger. Elements 32 find their support on bottom wall 30 of housing 12 to extend transversely thereof as shown in FIG. 2, with tubular elements 22 resting upon but not attached to bar elements 32. Since the left hand end of the absorber-exchanger 14 (as shown in FIG. 1) is fixed to housing 12 and the right hand end is connected to housing 12 through flexible connector 20, the tubular array, slidably supported on bars 32 is free to expand or contract with heat changes within housing 12. As the temperature therein approaches a level which might cause damage to array 14, the non-fixed right hand end of the array has expanded slightly in the direction of the longitudinal arrow, FIG. 3.

The exchanger, particularly the tubular elements 22, may be of plastic such as acrylonitrile/butadiene/styrene (ABS) or polyvinyl chloride (PVC) and preferably loaded with carbon black or the like for optimum heat absorption. Such materials have a coefficient of expansion of from 6 to 13 $\times$ $10^{-5}/°$ F. Housing 12 as above mentioned, may be fabricated of a glass filled plastic (fiberglass) or of steel or aluminum (thermal expansivity of from 0.4 to 1.3 $\times$ $10^{-5}/°$ F.) A thermal insulation layer may be provided on the inner surfaces of the housing to reduce the passage of solar heat to the exterior. A temperature differential of 100° F will cause array 14 (if fabricated 10 feet long) to expand approximately one inch relative to housing 12. Such differential motion is employed as below described to open and close cover 33 as shown in FIGS. 2, 3 and 4. As best shown in FIGS. 2 and 3 when the temperature within housing 12 is below a preselected critical level, housing cover 33 is drawn into snug marginal engagement with the open end housing by the combined weight of cover 33 and a pair of springs 36. Springs 36 are maintained in tension by the lever arms 38 of a pair of bellcranks generically designated 40. A shaft 42 fixed to and extending transversely of housing sidewalls 27 provides pivotal mounting for bellcranks 40. The vertical bellcrank arms 44 are pivotally attached to the outermost elements 22 of array 14 by pintle bolts 46. A pair of springs 48 are mounted in fixtures 50 on opposite side walls of housing 12 and are normally maintained under compression by the weight of cover 33 and the tension of springs 36 when bellcranks 40 are in their normal position as shown in FIG. 2.

As above mentioned, array 14 (of an assumed length of ten feet) will expand longitudinally some 1 inch in response to a temperature differential of 100° F relative to the housing 12 when fabricated of certain materials above described. The device is designed normally to assume the FIG. 2 position until the internal housing temperature approaches a level considered likely to damage plastic exchanger 14. Such expansion moves the free end of the exchanger 14 in the horizontal arrow direction of FIG. 3 position. Arms 38 then rotate clockwise to relieve the tension on springs 36 sufficiently to allow compression springs 48 to raise cover 33 sufficiently to vent the interior of housing 12 with ambient air. As the internal temperature gradually drops with resultant contraction of the exchanger 14, bellcranks 40 are rotated counter-clockwise, increasing the tension of springs 36 sufficiently to compress springs 48 to the FIG. 2 position with resultant closure of cover 33.

An alternative embodiment of the device is shown in FIG. 4, wherein bellcranks 40 have their vertical lever arms mounted to lugs 52 to project outwardly of manifold 16 in the plane of exchanger 14. Bellcranks 40 are pivoted to housing 12 at 54, with arms 38 extending outwardly from the exchanger 14 and biased counter-clockwise by tension springs 56. As the exchanger 14 expands, the lever arms 38 are pivoted counter-clockwise to relieve the tension of springs 56 and cover 33 is raised by springs 48 in the manner above described.

I claim:

1. A solar heat collector having in combination:
    a solar absorbing heat exchanger for exposure to solar radiation;
    a housing enclosing said exchanger and having a movable wall portion of a material transparent to solar radiation;
    means for the support for said exchanger within said housing,
    said support means permitting heat induced expansion of a portion of said exchanger in respect to said housing;
    means fixing a portion of said exchanger to said housing to prevent movement is respect thereto; and
    means responsive to heat induced expansion and contraction of said exchanger for separation of said movable wall from said housing,
    whereby to permit ambient air to circulate within said housing with resultant cooling of said exchanger.

2. The device of claim 1 wherein said exchanger is of a plastic material having a coefficient of expansion in the order of 6 to 13 $\times$ 10$^{-5}$/° F and said housing is of a material having a coefficient of expansion in the order of 0.4 to 1.3 $\times$ 10$^{-5}$/° F.

3. The device of claim 1 wherein said exchanger is of acrylonitrile/butadiene/styrene with at least the exposed surface thereof containing sufficient carbon black to effect high solar heat absorption.

4. The device of claim 1 wherein said exchanger is of polyvinyl chloride with carbon dispersed therein.

5. The device of claim 1 wherein the means effecting separation of said movable portion from said housing includes:
    a bellcrank having first and second lever arms and its vertex pivotally attached to said housing;
    means pivotally attaching said second arm to said exchanger at a point spaced from the portion thereof fixed to said housing;
    tension spring means cooperatively connecting said first arm to said movable wall normally to maintain said wall in sealing engagement with said housing; and
    compression spring means supported by said housing and normally maintained compressed by the combined weight of said movable wall and the urge of said tension spring means.

6. The device of claim 1 wherein a non-fixed margin of said exchanger is provided with a lug extending outwardly thereof in the plane of the exchanger, and said wall separation means includes a bellcrank mounted within said housing and having a first arm pivotally attached to said lug and a second arm connected through a tension spring to said movable wall.

7. The device of claim 1 wherein said exchanger comprises an elongate structure including:
    tubular inlet and outlet manifolds at opposite ends thereof and an intermediate solar absorbing and heat exchanging core defining a planiform configuration;
    means fixing one of said manifolds to said housing; and
    means supporting said core within said housing in slidable relation therebetween.

8. The device of claim 7 wherein said core comprises a plurality of tubular elements disposed in a parallel array.

* * * * *